June 6, 1967 W. F. WOLFNER II, ETAL 3,323,804

DICTATION APPARATUS

Original Filed May 21, 1962 8 Sheets-Sheet 1

INVENTORS
WILLIAM F. WOLFNER II, JOHN G. WALLACE,
GEORGE L. SOLTIS, MERLE H. GRISWOLD,
JOHN R. MONTGOMERY

BY Curtis, Morris & Safford
ATTORNEYS

June 6, 1967 W. F. WOLFNER II, ET AL 3,323,804

DICTATION APPARATUS

Original Filed May 21, 1962 8 Sheets-Sheet 2

INVENTORS
WILLIAM F. WOLFNER II, JOHN G. WALLACE,
GEORGE L. SOLTIS, MERLE H. GRISWOLD,
JOHN R. MONTGOMERY
BY
Curtis, Morris + Safford
ATTORNEYS

DICTATION APPARATUS

Original Filed May 21, 1962

INVENTORS
WILLIAM F. WOLFNER II, JOHN G. WALLACE,
GEORGE L. SOLTIS, MERLE H. GRISWOLD
JOHN R. MONTGOMERY
BY
Curtis, Morris & Safford
ATTORNEYS June 6, 1967 W. F. WOLFNER II, ETAL 3,323,804

DICTATION APPARATUS

Original Filed May 21, 1962 8 Sheets-Sheet 4

INVENTORS
WILLIAM F. WOLFNER II, JOHN G. WALLACE,
GEORGE L. SOLTIS, MERLE H. GRISWOLD
BY JOHN R. MONTGOMERY
Curtis Morris & Safford
ATTORNEYS

DICTATION APPARATUS

Original Filed May 21, 1962 8 Sheets-Sheet 5

INVENTORS
WILLIAM F. WOLFNER II, JOHN G. WALLACE,
GEORGE L. SOLTIS, MERLE H. GRISWOLD
BY JOHN R. MONTGOMERY
Curtis Morris & Safford
ATTORNEYS June 6, 1967 W. F. WOLFNER II, ETAL 3,323,804

DICTATION APPARATUS

Original Filed May 21, 1962 8 Sheets-Sheet 6

INVENTORS
WILLIAM F. WOLFNER II, JOHN G. WALLACE,
GEORGE L. SOLTIS, MERLE H. GRISWOLD
BY JOHN R. MONTGOMERY
Curtis Morris & Safford
ATTORNEYS

DICTATION APPARATUS

Original Filed May 21, 1962

INVENTORS
WILLIAM F. WOLFNER II, JOHN G. WALLACE,
GEORGE L. SOLTIS, MERLE H. GRISWOLD
BY JOHN K. MONTGOMERY
Curtis Morris & Safford
ATTORNEYS

DICTATION APPARATUS

Original Filed May 21, 1962

INVENTORS
WILLIAM F. WOLFNER II, JOHN G. WALLACE,
GEORGE L. SOLTIS, MERLE H. GRISWOLD
BY JOHN R. MONTGOMERY
Curtis Morris + Safford
ATTORNEYS

3,323,804
DICTATION APPARATUS

William F. Wolfner II, Trumbull, John G. Wallace, Branford, George L. Soltis, Shelton, and Merle H. Griswold and John R. Montgomery, Trumbull, Conn., assignors to Dictaphone Corporation, Bridgeport, Conn.

Original application May 21, 1962, Ser. No. 196,189, now Patent No. 3,256,025, dated June 14, 1966. Divided and this application July 19, 1965, Ser. No. 486,249
14 Claims. (Cl. 274—21)

This invention relates to dictation apparatus, and the present application is a division of application Ser. No. 196,189, filed May 21, 1962, now U.S. Patent 3,256,025. More in particular, this invention relates to improved and simplified apparatus for facilitating the recording of dictation on a moving record and the playback of such recorded dictation.

In order to provide for efficient use of office dictating machines, it is desirable to simplify the various actions that must be taken by the dictator in operating the machine. For example, it should be possible to backspace the machine rapidly to any part of the previously dictated material simply by pressing a control button on a hand-held microphone or the like. Also, it is desirable to reduce to a minimum the effort required by the dictator in removing a completed record and replacing it with a fresh record. In addition, positive-acting means should be provided to apprise the dictator of certain conditions, such as the approach of the end of the record or whether a record is properly in place in the machine, so that the dictator will be sure to use his time most productively.

Various proposals have been made from time to time in an effort to meet such objectives, but those proposals have not been fully satisfactory in a number of respects. Most importantly, these proposals generally have resulted in highly complicated apparatus which has not only been too expensive to produce commercially, but also of questionable reliability.

Accordingly, it is an object of this invention to provide dictation apparatus that is superior to such apparatus available heretofore. A more specific object of this invention is to provide a dictating machine having a unique and advantageous backspacing mechanism which is operable remotely to permit playback of any previously recorded material. A still further object is to provide means to permit the dictator quickly and easily to remove a filled record and to replace it with a fresh record. Yet another object of this invention is to provide improved and simplified means for warning a dictator audibly of certain operating conditions of the machine. A still further object is to provide dictation apparatus that is economical to manufacture and reliable in operation. Other objects, aspects and advantages of the invention will be in part pointed out in, and in part apparent from, the following description considered together with the accompanying drawings, in which:

Figure 1:
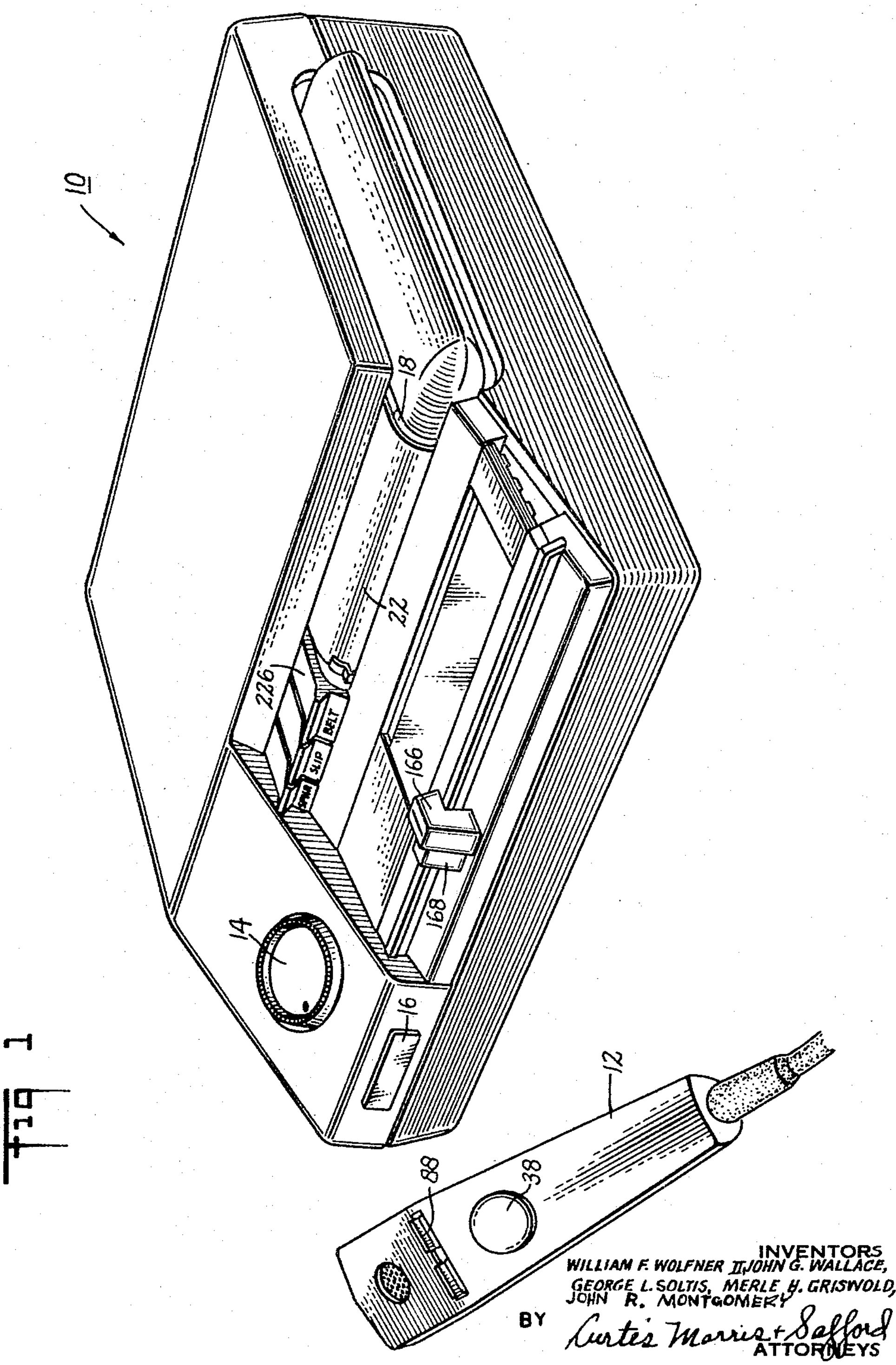
FIGURE 1 is a perspective view of a dictating machine incorporating the present invention.

Referring now to FIGURE 1, there is shown a dictating machine 10 having a hand microphone 12 with various operating controls as will be described. Near the front of the machine 10 is a knob 14 which functions as a volume control. Beneath this knob is an indicator lamp 16 which glows to show that the machine is turned on.

Figure 2:
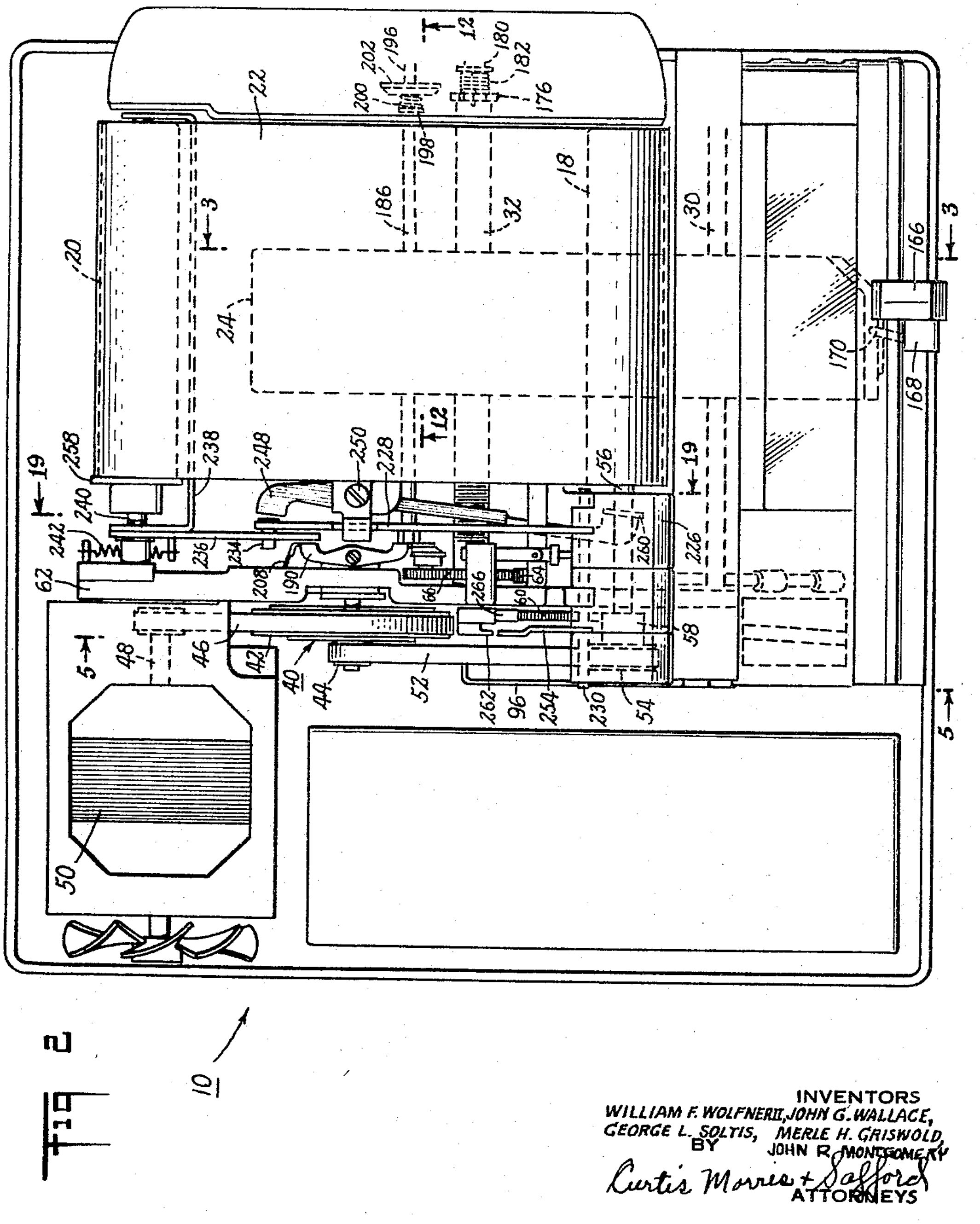
FIGURE 2 is a horizontal section of the machine, taken under the machine housing and showing the layout of the principal operating parts.

Referring also to FIGURE 2, the machine 10 includes a pair of parallel mandrels 18 and 20 adapted to support a plastic belt record 22 of a type commonly used for dictation purposes. Positioned beneath the belt record is a movable carriage 24 (FIGURES 3 and 4) on which is mounted a recording head 26 and a reproducing head 28 engageable with the record. This carriage is supported by a guide rod 30 and a feedscrew 32, the latter serving to drive the carriage 24 by means of a feednut 36 such as is described in more detail in copending application Ser. No. 185,619, filed by John Wallace and George Soltis on Apr. 6, 1962.

Figure 5:
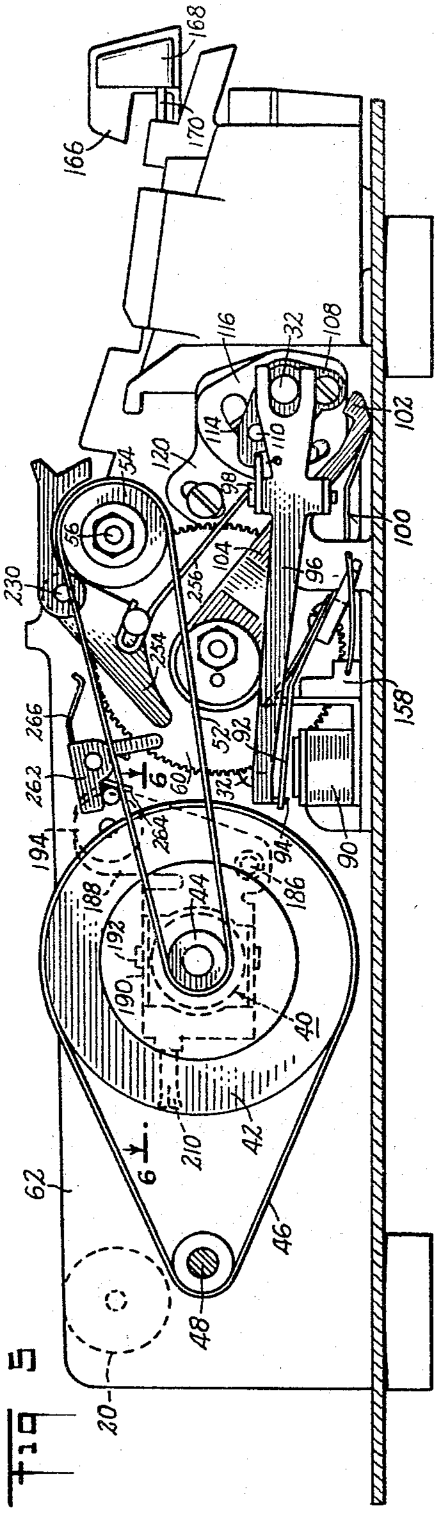
FIGURE 5 is a cross section taken along line 5—5 of FIGURE 2, showing the drive train and the backspacing mechanism.

To start recording, the dictator first presses a "Dictate" button 38 on the hand microphone 12. This button operates a switch which, through suitable circuitry not shown, actuates an electromagnetic clutch 40 (FIGURES 2 and 6), e.g. of the type more fully described in copending application Ser. No. 193,964, filed by John G. Wallace and Merle H. Griswold, on May 11, 1962, now Patent No. 3,206,212. Referring also to FIGURE 5, when this clutch is actuated, it connects together an outer drive pulley 42 and an inner drive pulley 44. The outer pulley 42 is connected by a belt 46 to the shaft 48 of a motor 50, the latter being energized when the microphone is removed from its cradle. The inner pulley 44 is connected by a belt 52 to another pulley 54 integral with a shaft 56 connected to the drive mandrel 18 supporting the belt record 22. Accordingly, when the dictator presses the Dictate button 38, the drive mandrel rotates the belt record with respect to he recording and reproducing heads 26 and 28.

Figure 14:
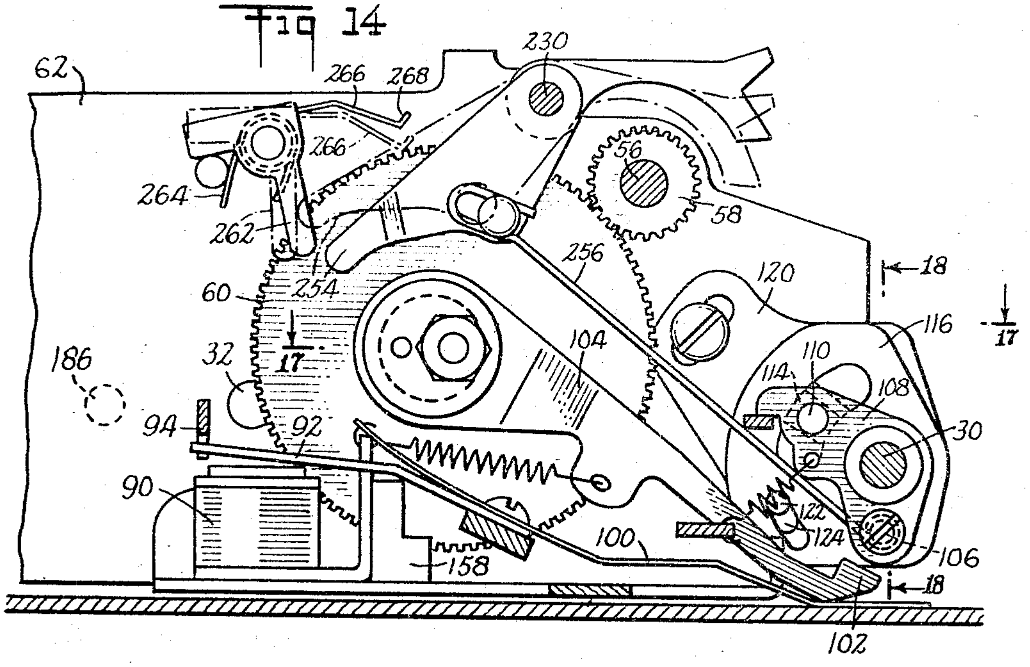
FIGURE 14 is a section to show certain aspects of the backspacing mechanism.

As shown in FIGURE 2, the drive mandrel shaft 56 also carries a gear 58 which is connected to an intermediate gear 60 (FIGURE 14) the shaft of which extends through a bearing in the machine frame 62 to a gear 64 meshing with another gear 66 secured to the feedscrew 32. Accordingly, when the belt record 22 rotates, the feedscrew similarly rotates to drive the carriage 24 laterally across the record.

Figure 13:
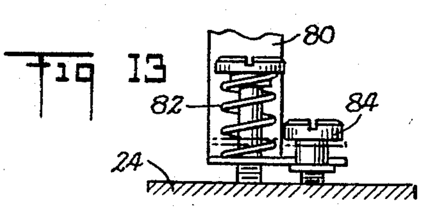
FIGURE 13 is a detail section taken along line 13—13 of FIGURE 3 to show the pressure adjustment and limit stop for the recording head.

The recording head 26 is carried by a balanced movable support arm 68 (FIGURE 3) which is pivoted at 70 and carries at its other end the outer body of a recording solenoid 72 controlled by the Dictate button 38. A light bias spring 69 is connected to the arm 68 to tend to rotate the arm 68 counterclockwise to keep the recording stylus 74 away from the record 22. The armature 76 of the solenoid is integral with a core member 78 (FIGURE 11) extending up through the solenoid and arranged to engage the underside of a pivoted spring arm 80 which is urged downwards by an adjustable spring 82 and the motion of which is limited by an adjustable stop 84 (FIGURE 13).

Figure 3:
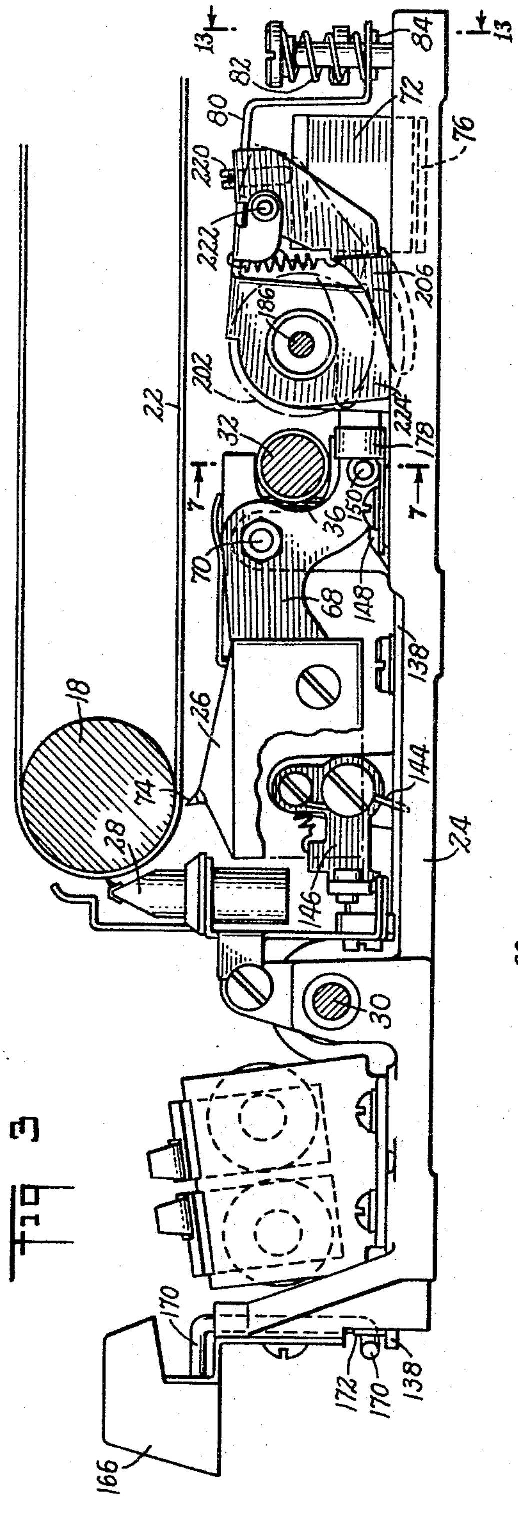
FIGURE 3 is a cross section taken along line 3—3 of FIGURE 2, particularly showing the machine carriage and its associated elements.

While the recording solenoid 72 is deenergized, the recording stylus 74 will be held about .015" from the record 22, and the solenoid body will be spaced a small distance (about .045") away from its armature 76 (as indicated generally in FIGURE 3). Further upward movement of the solenoid body is prevented by an overtravel spring 86 (FIGURE 11) surrounding the core member 78 which, in turn, is held by arm 80 acted upon by spring 82. The lower end of the overtravel spring bears against a washer 87 adapted to seat against a shoulder on core member 78 when the solenoid is deenergized, and thereby fix the spacing between the recording stylus and the record.

Figure 11:
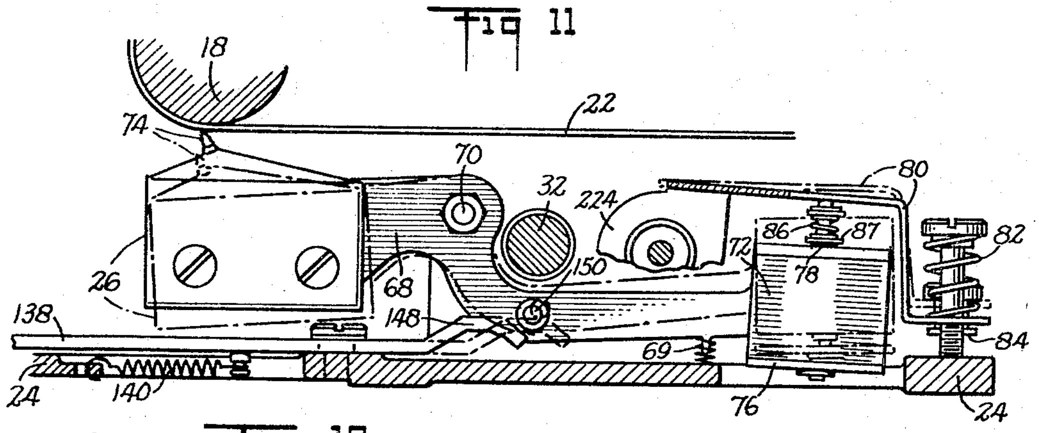
FIGURE 11 is a cross section taken along line 11—11 of FIGURE 4 to show details of the operating means for the recording head.

When the solenoid 72 is energized by actuation of the Dictate button 38, the solenoid body is pulled down towards its armature 76 and thus rotates support arm 68 clockwise to lift the recording head stylus 74 up against the record 22. During this movement, the force applied by the solenoid need only be sufficient to overcome the inertia of the support arm 68 and associated mechanical parts, and the fore of the light bias spring 69. After the stylus contacts the record, the momentum built up in the arm 68 assists in continuing its clockwise movement to the final position where the armature 76 is tight against the solenoid body (as shown in FIGURE 11) and the stylus is pressed against the record with a force determined by the spring arm 80 and its adjustable spring 82. Accordingly, it will be apparent that with this arrangement, the solenoid can be a relatively small device requiring only light power. Preferably, the solenoid is actuated by a pulse of current generated by pressing the Dictate button 38, and is maintained actuated by a low-level hold-in current.

With the recording head 26 engaged with the record 22, the feedscrew 32 rotating to drive the carriage 24 to the right (as seen in FIGURE 2), and the record rotating on the mandrels 18 and 20, any words spoken into the microphone 12 will be recorded in the usual fashion on the belt record. If the dictator releases the Dictate button 38, the clutch 40 is de-actuated, but the recording solenoid 72 remains actuated by means of suitable circuitry to maintain the required low-level hold-in current to this solenoid.

Figure 15:
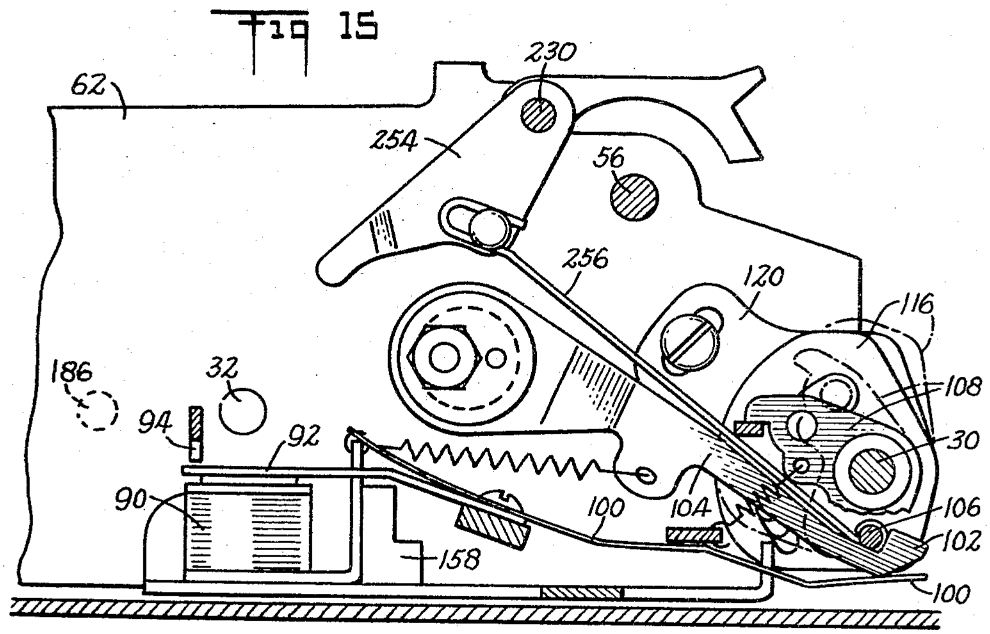
FIGURE 15 is a view like FIGURE 14, but showing further aspects of the backspacing mechanism.
Figure 16:
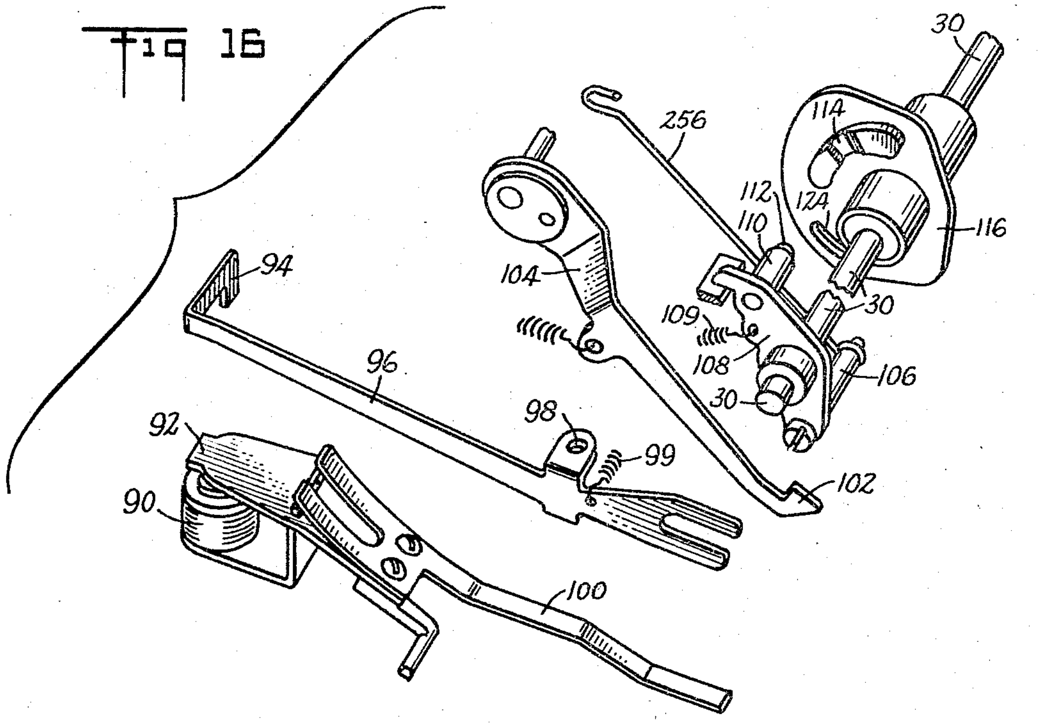
FIGURE 16 is an exploded view showing the principal elements of the backspacing mechanism.

If the dictator wishes to reproduce any of the material already recorded, the first presses a two-position control button 88 on the hand microphone to its "backspace" position. This immediately deactuates the recording solenoid 72 and, referring also to FIGURES 14 and 15, energizes a backspace solenoid 90 the armature 92 of which is pulled down to the position shown in FIGURE 15. To assure a full backspacing step following a momentary actuation of button 88, the armature 92 is held down by a finger 94 on the end of a locking lever 96 (FIGURE 5) which is rotatably urged about a vertical pivot axis 98 by a spring 99 (FIGURE 16).

The backspace solenoid armature 92 carries with it a spring arm 100 the right-hand tip of which lifts up the hook end 102 of a control arm 104. This control arm is eccentrically mounted with the intermediate gear 60 and therefore continually reciprocates, in a generally left-to-right direction as seen in FIGURE 15, towards and away from a pin 106 (FIGURE 18) which is secured to a rocker arm 108 fastened to the carriage guide rod 30. When the spring arm 100 raises up the control arm 104, its hook end 102 engages pin 106 so that, on the next leftward movement of the control arm, the pin is pulled to the left and thus rotates the rocker arm and the guide rod clockwise.

Figures 17, 18:
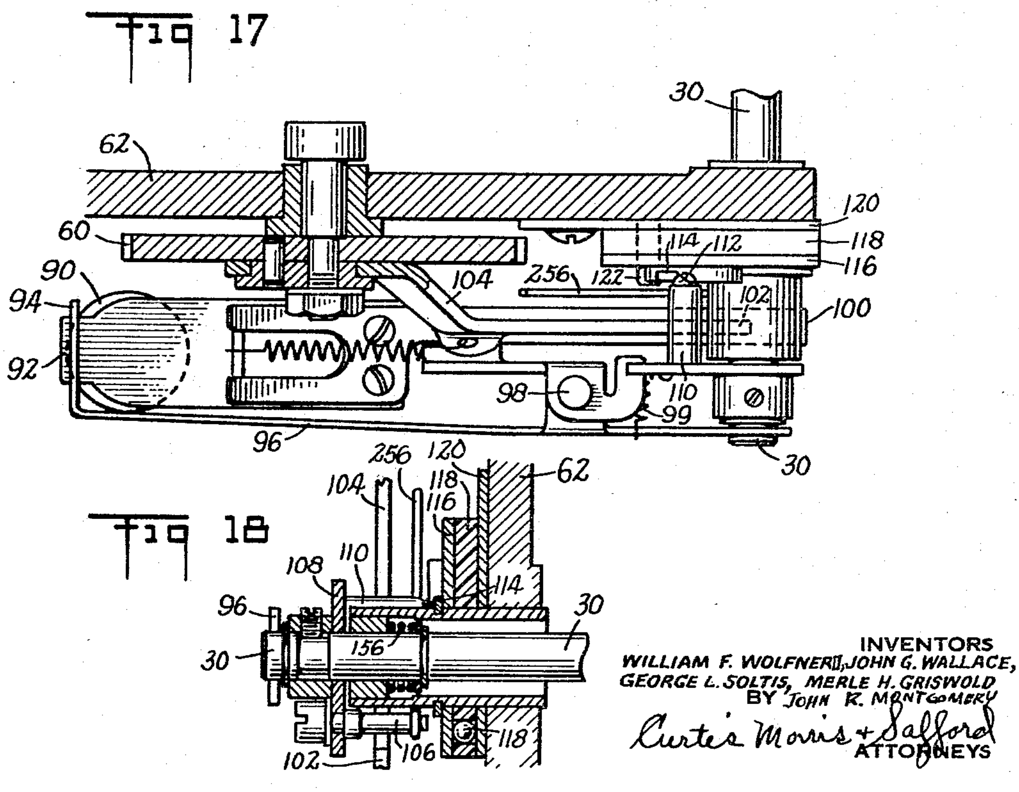
FIGURE 17 is a horizontal section taken along line 17—17 of FIGURE 14.
FIGURE 18 is a detail section taken along line 18—18 of FIGURE 14.

The rocker arm 108 is provided with a horizontally extending stud 110 the end of which carries a ball 112. This ball normally is seated in a detent recess 114 formed in a segmental plate 116 which is rotatably mounted on the guide rod 30, and which is provided with a bearing arrangement comprising a nylon block 118 serving as a ball bearing cage between plate 116 and afixed member 120 (FIGURE 18). As the arm 108 rotates, its rotary motion is transmitted through the ball 112 to the plate 116, and this plate rotates correspondingly until it strikes a frame-mounted stop pin 122 (FIGURE 15) extending through an arcuate slot 124 in the plate. The rotational position of the guide rod 30 at this point in the cycle is referred to herein as the "intermediate" position.

As the rocker arm 108 continues rotating clockwise, the ball 112 rides up the inclined ramp at the edge of the detent recess 114, and thus forces the rocker arm together with the carriage guide rod 30 away from the plate 116, i.e. to the left as viewed in FIGURE 18. As will be explained, this axial movement of the guide rod shifts the carriage 24 a corresponding distance to the left to provide the desired backspacing movement.

Figures 9, 10:
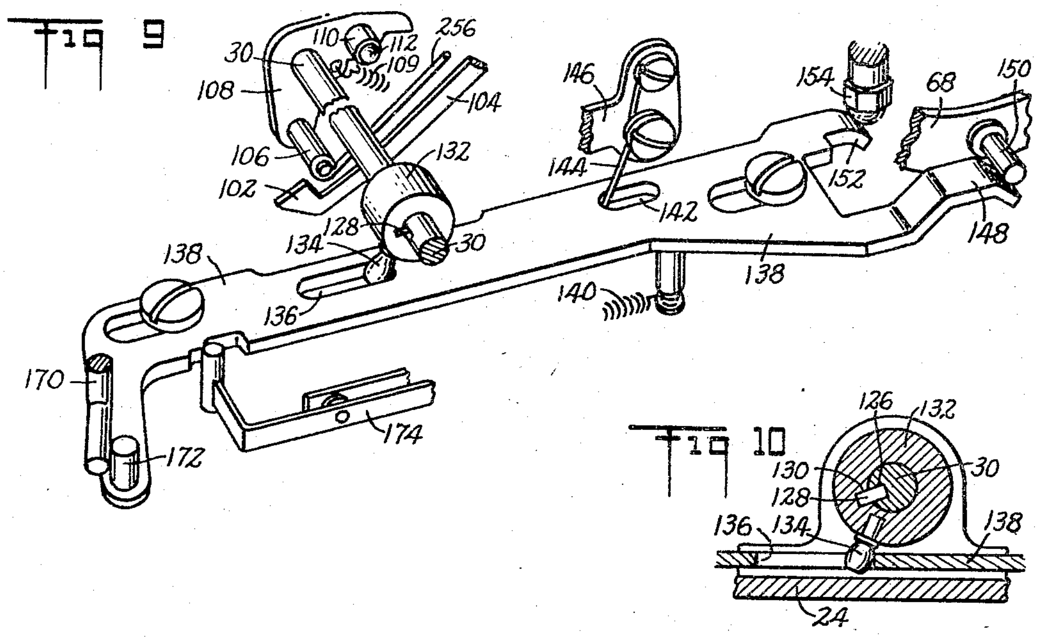
FIGURE 9 is a perspective view of the carriage slide and associated elements.
FIGURE 10 is a detail section taken along line 10—10 of FIGURE 4, showing the guide rod bushing.

Before the carriage 24 may be backspaced in this manner, it is necessary to disengage the feedscrew 32 from its feednut, and to shift the recording and reproducing heads 26 and 28 away from the record 22. To this end, and referring now to FIGURE 9 and 10, the carriage guide rod 30 is formed with a keyway 126 to receive a key 128 which also extends into a slot 130 in a bushing 132 mounted for travelling movement with the carriage 24. This bushing carries a finger 134 which extends into a slot 136 in a slide 138 which is slidably supported on the carriage. When the guide rod 30 is rotated during a backspacing operation as described hereinabove, the bushing 132 is correspondingly rotated and the finger 134 shifts the slide towards the rear of the machine 10 against the tension of a spring 140.

Extending down into another slot 142 in the carriage slide 138 is the free end of a wire spring 144 which is wrapped around a bushing secured to the pivoted arm 146 carrying the reproducing head 28. As the slide is shifted towards the rear of the machine 10, the wire spring 144 rotates the arm 146 about its pivot axis thereby causing the head 28 to drop down away from the record 22.

The slide 138 also is formed with an upwardly extending cam surface 148 adapted to engage a pin 150 on the recording head support arm 68. As the slide is shifted to the rear, as explained hereinabove, it cams this pin 150 upwardly (FIGURE 3), causing the support arm 68 to be rotated counterclockwise about its pivot axis and thereby shifting the recording stylus 74 down away from the record belt 22 as indicated in dotted outline in FIGURE 11. Another cam surface 152 on the slide engages the lift pin 154 on the feednut 36 and shifts it upwardly to permit the feednut to run free, thereby effectively disengaging the feedscrew 32 from the carriage 24.

Rotation of the carriage guide rod 30 to its intermediate position (as defined hereinabove) moves the slide 138 a sufficient distance to completely disengage the recording and reproducing heads 26 and 28 and the feedscrew 32. Accordingly, the carriage is free to be backspaced in response to the further rotation of the guide rod 30 to its limit position, i.e. as the rocker arm ball 112 rides up the inclined ramp on the segmental plate 116.

In order that the carriage 24 be moved to the left with the guide rod 30 when the latter is shifted axially as described hereinabove, it is necessary first to lock the carriage to the guide rod, since normally the carriage bushing 132 slides freely along the rod. In the present embodiment this is accomplished in a very simple manner by the rotary force applied through the bushing 132 and the finger 134 against the carriage slide 138 and its spring 140. This force develops a frictional bind between the key 128 and its keyway 126 so that, as the guide rod subsequently is shifted axially, the bushing and the carriage move with it.

The backspacing cycle is completed when the control arm 104 moves back to the right to allow the guide rod 30 to rotate in reverse (counterclockwise) back to its normal position under the urging of a spring 109 fastened to the rocker arm 108, supplemented by the force of the carriage slide spring 140. As the guide rod starts this reverse rotation, the ball 112 is frictionally engaged at the top of the inclined ramp on the segmental plate 116 and therefore rotates this plate back until the latter is stopped by the pin 122 extending through the arcuate slot 124. Thereafter, the ball 112 rides down the incline of the detent recess 114 so that the guide rod is released to be moved to the right (FIGURE 18) by the guide rod spring 156.

During the initial portion of this reverse rotation of the guide rod 30, i.e. while the ball 112 remains at the top of the inclined ramp on the plate 116, the spring force applied through the bushing key 128 is reduced to such an extent that the carriage 24 no longer is locked to the guide rod. Therefore, as the ball rides down the inclined ramp during the final portion of the reverse guide rod rotation, the resulting axial movement of the guide rod does not produce any corresponding movement of the carriage, i.e. the carriage remains in its backspaced position. Also, during this reverse rotation of the guide rod, the carriage slide 138 is returned to its normal position, thus reengaging the recording and reproducing heads 26 and 28 with the record 22 and locking the feednut 36 to the feed screw 32.

As the guide rod 30 is shifted axially to the left (referring to FIGURE 2) during the first half of the backspacing cycle, it carries with it the forked end of the locking level 96 so that, when the backspacing movement is complete, the locking finger 94 will have been shifted off to one side of the backspace solenoid armature 92. Therefore, if the backspace solenoid is no longer energized at this time, its armature will return to normal position and no more than one backspacing cycle can be effected. In one embodiment of this invention, the clutch 40 was energized during backspacing by a switch controlled by the armature 92, e.g. as indicated at 158 in FIGURE 5. Thus, if the control button were pressed only momentarily, the backspacing operation stopped when the solenoid 90 was released by the finger 94, and the last half of the cycle was completed when the control button 88 was shifted to its "listen" position. However, if the control button 88 is held in its backspace position, the reciprocating motion of the control arm 104 will continue to oscillate the guide rod 30 to provide a successive series of backspacing steps.

When the desired amount of backspacing has been obtained, the dictator shifts the control button 88 through its neutral position to its "listen" position. This completes an energizing circuit to the clutch 40, and accordingly the record 22 will be rotated while the carriage 24 is driven forward by the feedscrew 32. Since the reproducing head 28 always is engaged with the record except during the backspacing movement, it already is in condition to sense the dictation previously placed on the record. The recording solenoid 72 was deactuated as a result of the movement of slide 138 during backspacing, and the energizing circuit for this solenoid is maintained deactuated so that the recording stylus 74 is not in contact with the record while the recorded material is being played back.

Actuation of the control button 88 to its listen position also activates relay switching circuitry which, as is usual in dictating machines, connects the reproducing head 28 to an input of the recording-reproducing amplifier (not shown herein) and connects the output of this amplifier to a loudspeaker or to the sound transducer in the hand microphone 12. The circuitry for accomplishing this switching may be the kind used conventionally heretofore, but preferably is in accordance with the disclosure of copending application Ser. No. 196,188, filed by Marion P. Shorb and Merle H. Griswold, on May 21, 1962, and now abandoned.

After the dictator has played back all of the recorded material up to the point of previous farthest advance of the carriage 24, he can condition the machine 10 for further recording operations merely by pressing the Dictate button 38. As described hereinabove, this button energizes the recording solenoid 72 so as to bring the recording head 26 into engagement with the record 22. In addition, pressing the Dictate button operates the relay switching circuitry to reconnect the recording-reproducing amplifier for recording operations, so that sounds spoken into the microphone are amplified and fed to the recording head.

To permit the dictator to move the carriage 24 by hand, there is provided on the front of the machine a manually-operable shift arm 166 (FIGURE 1) which extends into the interior of the machine and is secured to the carriage as shown in FIGURE 3. Since such movement of the carriage can take place only when the feedscrew 32 is disengaged and the recording and reproducing heads 26 and 28 are out of contact with the record, this shift arm is provided with a thumb button 168 which is connected through a linkage 170 to a pin 172 (FIGURE 9) at the forward end of the slide 138 on the carriage. When this thumb button is squeezed against the shift arm, the slide is moved to the rear of the machine and, as described hereinabove, releases the feedscrew and disengages the recording and reproducing heads from the record. While the button is held in this position, the shift arm can be moved to the left or to the right in order to move the carriage correspondingly with respect to the record. It should also be noted that the slide controls a switch 174 which, when the slide returns to its forward position, reenergizes the recording solenoid 72 which had been de-actuated when the recording head was pulled away from the record.

Figure 7:
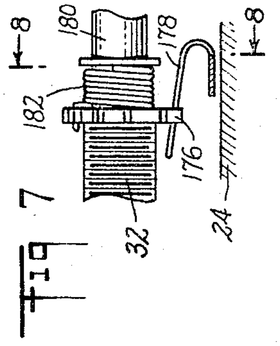
FIGURE 7 is a detail section taken along line 7—7 of FIGURE 3, showing the means for warning the dictator that the end of the record is approaching.
Figure 8:
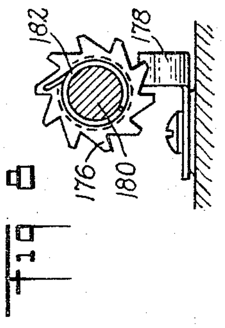
FIGURE 8 is a detail section taken along line 8—8 of FIGURE 7.

When the recording head 26 approaches the end of the record 22, it is desirable to activate a warning signal so that the dictator can properly arrange his dictation. For this purpose, and referring now to FIGURE 2, a toothed wheel 176 is mounted on the right-hand end of the feedscrew 32 and is adapted to engage a bent flat spring 178 (FIGURES 7 and 8) which is attached to the carriage. This spring comes into contact with the wheel 176 when the carriage is about one-eighth of an inch away from the end of the record, and produces a clicking sound to signify to the dictator that the end of the record is approaching. As the carriage continues to move, the wheel strikes the spring progressively nearer to its free end, thereby changing the tone of the warning signal as an approximate indication to the dictator of the amount of recording time remaining.

The toothed wheel 176 is clutched to the feedscrew shaft 180 by means of a helical spring 182 wound on the feedscrew shaft and having one end inserted into the wheel, the other end of the spring being free. When the wheel is rotating in a clockwise direction (FIGURE 8) and strikes the flat spring 178, the helical spring 182 tightens about the shaft 180 and thus locks the wheel to the shaft. If the wheel were rotating in reverse direction, the helical spring would loosen and declutch the wheel from the shaft 180.

Figure 12:
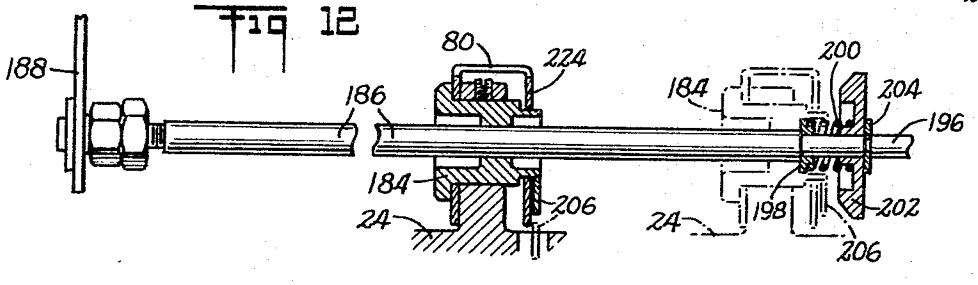
FIGURE 12 is a detail section taken along line 12—12 of FIGURE 2 to show the control rod used for sensing the end-of-record position.

When the recording head 26 reaches the end of the record, it is desirable automatically to stop the machine and also signal the dictator that a fresh record must be inserted. For this purpose, and referring now to FIGURES 2, 6 and 12, slidably mounted within a bushing 184 on the carriage 24 is a control rod 186 the left-hand end of which is fastened to a paddle-shaped extension 188 of a lever plte 190 having a vertical pivot axis 192. This extension 188 normally is held in the position shown by a small magnet 194 secured to the machine frame 62. At the right-hand end of the control rod there is a reduced-diameter portion 196 which extends out through a relatively large hole in the machine frame. Slidably mounted on this portion 196 is a small washer 198 which normally is urged against the control rod shoulder by a coil spring 200 the right-hand end of which is seated in an annular recess in a disc 202 held by a locking ring 204.

As the carriage 24 approaches the end of the record, the interior wall of the bushing 184 engages the small washer 198 and moves it to the right to compress the coil spring 200. When the end of the record is reached, a pivotally-mounted flag 206 (which extends down alongside the bushing 184 as seen in FIGURE 3) strikes the outer rim of the disc 202 and forcibly shifts the control rod 186 to the right, breaking the hold of the magnet 194 on the paddle-shaped extension 188. The coil spring 200 therefore expands and shifts the control rod 186 further to the right, thereby pivoting the lever plate 190 about its axis 192.

Figure 6:
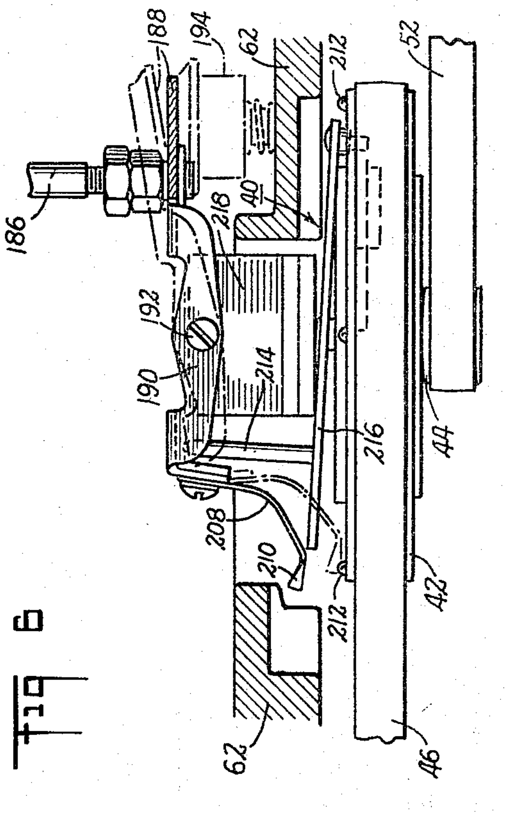
FIGURE 6 is a detail section taken along line 6—6 of FIGURE 5, particularly showing portions of the mechanism for deactuating the clutch.

As shown in FIGURE 6, the rearward end of the lever plate 190 carries a flexible spring arm 208 having at its end a tab member 210 adapted to contact the numerous small side projections 212 which are spaced around the peripheral surface of the drive pulley 42. The force of the coil spring 200, acting through the control rod 186 and the lower plate 190, urges the tab member 210 towards pulley 42 to assure continued contact with the projections as they move by. This produces a distinctive clicking sound which indicates immediately to the dictator that the end of the record has been reached.

The rearward end of the lever plate 190 is also arranged to engage a push rod 214 which is secured to the armature 216 of the clutch 40. When the lever plate swings about its pivot axis 192 as described hereinabove, it shifts this push rod axially and thus forces the armature 216 away from the clutch electromagnet 218. This immediately deactuates the clutch, and the record 22 and the feedscrew 32 both stop turning.

It should be noted that the magnet 194 provides more force on the paddle-shaped extension 188 than the coil spring 200, even when the latter is fully compressed. Therefore, there must be direct mechanical engagement between the carriage 24 and the control rod 186 before the magnet will release its hold. Accordingly, this arrangement provides a consistent "break point," i.e. the clutch will always be deactuated when the carriage reaches a predetermined position.

In the embodiment of the invention disclosed herein, and in common with many dictating machines used heretofore, the reproducing head 28 engages the record 22 a small distance to the left (viewed from the front of the machine) of the point where the recording head 26 engages the record, in order to permit a "quick review" of the last few words dictated. Accordingly, during playback the carriage must be permitted to move a small distance beyond the end-of-record point without de-actuating the clutch, to assure that all of the previously dictated material may be played back.

Figure 4:
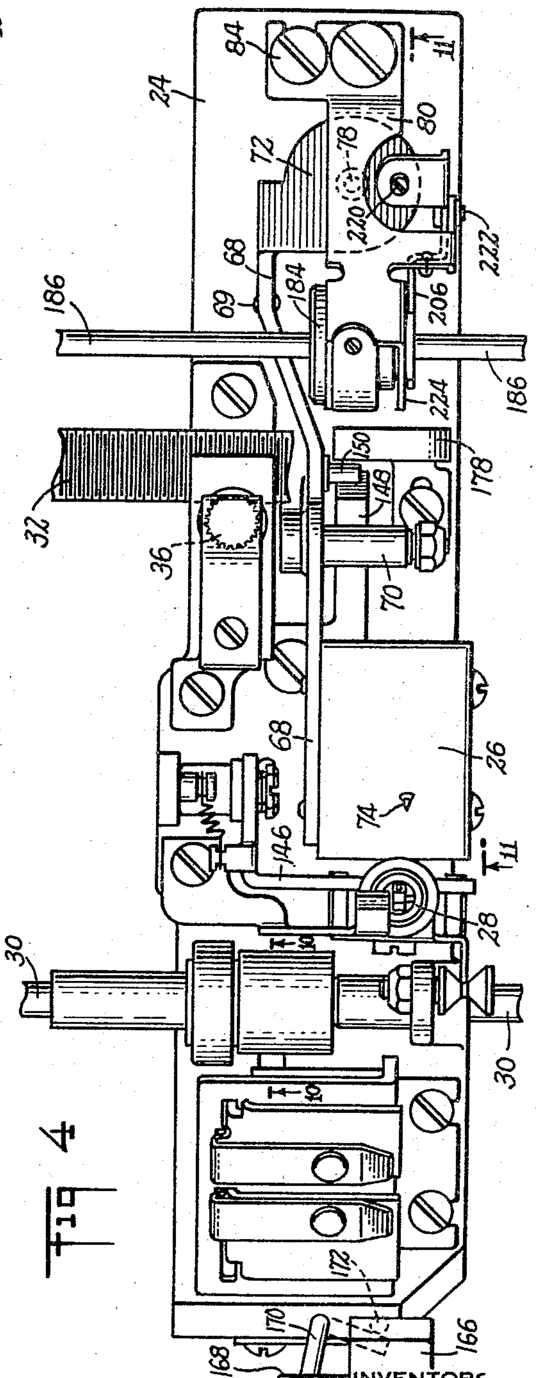
FIGURE 4 is a top view of the carriage shown in FIGURE 3.

To this end, and referring to FIGURES 3 and 4, the upper end of the flag 206 extends horizontally over the recording solenoid 72 and is provided with an adjustable screw 220 which is adapted to contact the top of the solenoid. If the machine is switched to play-back condition, the recording solenoid will be deenergized and will move up a small distance to rotate the flag 206 counterclockwise about its pivot axis 222, thus moving the lower end of the flag a substantial distance down below the control rod 186, as shown in bold outline in FIGURE 3. In this position, the flag will not strike the disc 202, and the carriage will continue to move until the disc is struck by the bushing member 224. At that point, all of the previously recorded material will have been played back, and the clutch 40 will be deactuated in the manner previously described.

Figure 19:
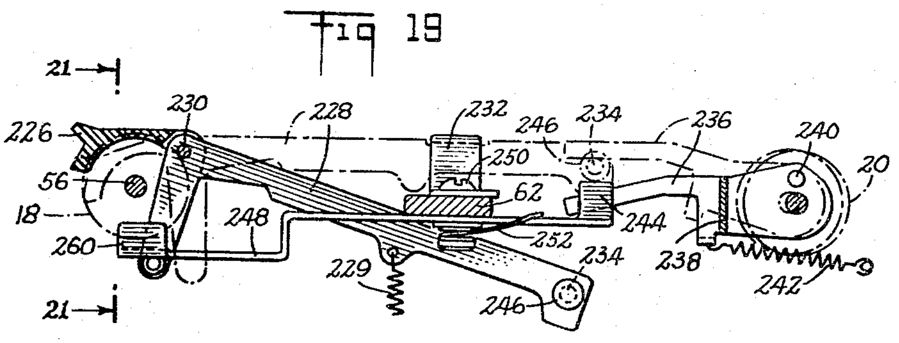
FIGURE 19 is a detail cross section taken along line 19—19 of FIGURE 2, showing the record release mechanism.
Figure 20:
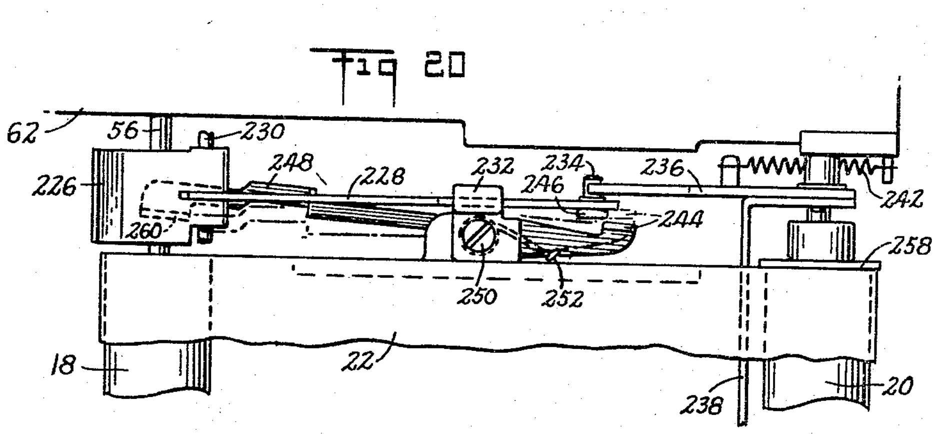
FIGURE 20 is a view looking down on the record release mechanism shown in FIGURE 19.
Figure 21:
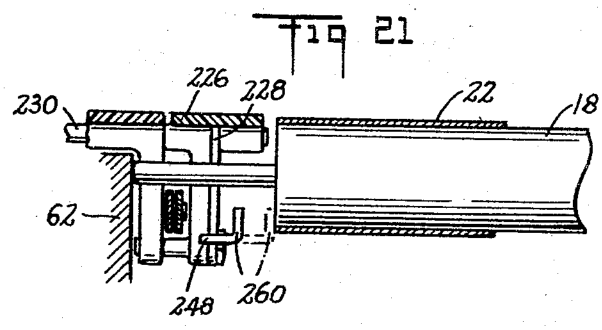
FIGURE 21 is a detail section taken along line 21—21 of FIGURE 19.

When the end of the record has been reached, and the clutch 40 deactuated, the dictator presses the "Belt" button 226 (FIGURE 1) on the front of the machine 10 in order to release the plastic belt record 22 for removal and replacement. Referring now to FIGURES 19–21, when this button 226 is pressed down, it raises a release lever 228 which is pivoted at the Belt button shaft 230 and is provided with an inverted U-shaped stop clip 232 to limit upwards movement at a position slightly above horizontal. This release lever carries at its rearward end a horizontal pin 234 which lies beneath a cocking lever 236 extending back to the support means 238 for the idler mandrel 20.

As the release lever 228 is moved up, it lifts the cocking lever 236 and thus rotates the mandrel support means about its pivot axis 240. This pivot axis is parallel to and above the axis of the idler mandrel, so that the clockwise rotation of the mandrel support means causes the idler mandrel to be shifted a small distance towards the front of the machine 10 and against the pressure of the idler mandrel loading spring 242. This forward movement of the idler mandrel removes the tension on the belt record 22 to permit it to be slipped off both mandrels 18 and 20.

The release lever 228 is held in its horizontal record release position by an upstanding tab 244 which moves in under a hardened steel disc 246 on the rearward end of the release lever. This tab is carried by a trigger lever 248 which is rotatably mounted on a vertical pivot 250 and urged in a counterclockwise direction (referring to FIGURE 20) by a spring 252.

Since to remove the record 22 it is necessary first to disengage the recording and reproducing heads 26 and 28, the Belt button shaft 230 also is connected (referring now to FIGURES 5 and 15) to an arm 254 which is slidably pinned to a lever 256 the remote end of which is secured to the rocker arm pin 106 (see FIGURES 16 and 18). Thus, when the Belt button is pressed down, the rocker arm 108 is rotated, just as in a backspacing operation, in order to rotate the guide rod 30. As previously explained, this shifts the slide 138 to the rear of the carriage 24 and disengages the recording and reproducing heads from the record. The lever 256 is slidably pinned to the arm 254 in order to permit the rocker arm 108 to rotate during backspacing without any corresponding rotation of the arm 254.

Accordingly, with the recording and reproducing heads 26 and 28 retracted from the belt record 22, and with the tension removed from the record due to the slight forward movement of the idler mandrel 20, the dictator now can grasp the filled record and slide it off the mandrels. It may particularly be noted that this operation can be effected entirely from the front of the machine, e.g. the dictator can place his thumb on the left hand edge of the record and push it entirely off the mandrels without encountering any obstructions.

When a new record is slid on the mandrels 18 and 20, its rear end will strike the flange 258 on the idler mandrel and its front end will strike an upstanding finger 260 on the forward end of the trigger lever 248. Further movement of the record will rotate the trigger lever clockwise (referring to FIGURE 20), it being noted that the rear end of the record will remain flush against the idler mandrel flange. When the trigger lever is rotated only a small amount, against its light spring 252, the tab 244 on the rear end of this lever moves out from under the release lever disc 246, thus freeing this lever for clockwise rotation under the urging of its bias spring 229. This, in turn, releases the cocking lever 236 which is acted upon by the mandrel loading spring 242. Therefore, almost instantaneously the idler mandrel is rotated to the rear about its eccentric mounting axis 240 and applies the required tension to the belt record. Although in this operation the front edge of the record was moved beyond its normal position on the drive mandrel 18, to actuate the trigger lever 248, when the idler mandrel shifts to the rear the record is automatically realigned in correct position on both mandrels.

It will be evident from the above that the record may quickly be installed on the mandrels 18 and 20 from the front of the machine, and without any significant effort by the dictator due to the hair-trigger action provided. The trigger lever 248 is pivoted at a point very near to its rearward end, thus providing a relatively large mechanical advantage so as to assure positive actuation by the plastic belt record. The rearward end of the trigger lever is weighted to provide a dynamic balance of this lever about its pivot axis, thus assuring that there will be no inadvertent operation of the release mechanism if the machine is jolted, as by dropping.

The machine 10 also includes means to warn the dictator whenever there is no record on the mandrels 18 and 20. For this purpose, and referring now to FIGURES 5 and 14, the arm 254, which is rotated clockwise when the Belt button 88 is pressed, is arranged to engage a bell crank 262 and rotate it against a bias spring 264. Secured to this bell crank is a spring arm 266 having a bent end 268 adapted to contact the teeth of the intermediate gear 60 whenever the Belt button is fully depressed, thus giving a clicking sound to indicate that the record belt is not in condition for recording. It should be noted that, with the hair-trigger record engagement mechanism described above, the Belt button will only be in its depressed position when there is no record on the mandrels, i.e. if a record is placed on the mandrels, the hair-trigger mechanism will be released and the Belt button will be raised. Accordingly, this arrangement voids any need for means for sensing physically the presence of the record.

Although a specific preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:

1. In a dictating machine of the type having movable means to carry a record and transducing head means operative with said record, and wherein a movable carriage means is provided for producing relative travelling movement between said transducing head means and said record, the combination of a guide rod for supporting said movable carriage means for straight-line movement; bushing means secured to said carriage means and slidable on said guide rod to support said carrige means during normal operation of the dictating machine; means mounting said guide rod for axial motion, drive means coupled to said guide rod for effecting said axial motion; locking means mounted on said carriage means and operable to secure said carriage means to said guide rod for movement therewith in said axial direction; and actuating means under the control of said drive means for operating said locking means prior to the movement of said guide rod in said axial direction.

2. Apparatus as claimed in claim 1 wherein said guide rod is mounted for both rotary and axial movements, said actuating means comprising means for rotating said guide rod, said locking means including locking control means responsive to such rotation of said guide rod for securing said carriage means to said guide rod.

3. Apparatus as claimed in claim 2 wherein said locking control means includes means responsive to rotary movement of said guide rod in one direction to secure said carriage means to said guide rod, and responsive to rotary movement in the opposite direction to release said carriage means from said guide rod.

4. Apparatus as claimed in claim 3, wherein said drive means includes cyclic means for effecting movements of said guide rod in the following sequence:

(1) rotary movement in said one direction to lock said carriage means to said guide rod, (2) axial movement away from a rest position combined with a continuation of said rotary movement in said one direction to produce the desired movement of the carriage means, and (3) axial movement back towards said rest position, combined with a rotary movement in said opposite direction to release said carriage means from said guide rod while the latter returns to its normal position.

5. A dictating machine comprising a carriage mounting transducing head means, revolvable means adapted to carry a record for operation with said transducing head means, motor means for driving said carriage past said record, guide rod means supporting said carriage, said guide rod means normally being stationary, means mounting said guide rod means for rotary and axial movement, means for securing said carriage to said guide rod means, control means arranged to rotate said guide rod means and to move said guide rod means axially while locked to said carriage, slide means on said carriage including means for releasing said head means from said record, bushing means secured to said carriage and slidable on said guide rod means, means for keying said bushing means to said guide rod means for rotation therewith, and coupling means carried by said bushing means and rotating therewith to effect the movement of said slide means on said carriage to release said head means.

6. Apparatus as claimed in claim 5, wherein said carriage slide means includes spring means resisting the movement of said coupling means, the force applied through said keying means by the rotation of said guide rod means being effective to lock said bushing means to said guide rod means for axial movement therewith.

7. A dictating machine comprising a carriage having transducing head means operative with a revolvably mounted record, a guide rod on which said carriage is slidably mounted, means mounting said guide rod for axial and rotational movement, locking means for securing said carriage to said guide rod to effect a movement thereof upon a axial movement of said guide rod, motor-operated drive means for effecting rotation of said guide rod, cam means operative upon rotation of said guide rod to shift it an incremental step axially while said carriage is locked thereto, release means coupled to said guide rod to disengage said transducing head means from said record upon rotation of said guide rod, said cam means including lost-motion means to effect the disengagement of said head means prior to the movement of said carriage, said drive means including a rocker arm secured to said guide rod, a drive plate adjacent said rocker arm and rotatably mounted on said guide rod, a cam surface on said drive plate and having a recess in which normally rests a cam follower on said rocker arm, and stop means for limiting rotational movement of said drive plate, further rotation of said rocker arm causing said cam follower to leave said recess and ride up said cam surface to effect axial movement of said guide rod.

8. Apparatus as claimed in claim 7, wherein said motor-operated drive means includes an eccentrically-mounted control arm arranged to produce reciprocating motion, and solenoid control means for engaging said control arm with said rocket arm to produce reciprocating rotation thereof.

9. Apparatus as claimed in claim 8, including lock-in means for maintaining engagement between said control arm and said rocket arm until a full backspacing step has been achieved.

10. A dictating machine comprising a carriage on which is mounted transducing head means engageable with a revolvable belt record, a pair of mandrels for supporting said belt record, a slide on said carriage and operative when moved to disengage said head means from said record, a guide rod for slidably supporting said carriage, means mounting said guide rod for both axial and rotational movement, locking means for securing said carriage to said guide rod, motion transmitting means coupling said guide rod to said slide to disengage said head means when said guide rod is rotated, cam means responsive to rotation of said guide rod and operative while said locking means is actuated to shift said guide rod in a direction to backspace said carriage, a belt release button, linkage means under the control of said release button to shift one of said mandrels towards the other mandrel to release the tension on said belt record to permit the record to be withdrawn from said mandrels, level means controlled by said belt release button and connected to said guide rod, said lever means being operable when said release button is actuated to rotate said guide rod and move said carriage slide to disengage said head means from said record, thereby preventing interference of said head means with the withdrawal of said record, latching means for holding said linkage means in the belt release position and for holding said lever means and said slide in the position where said head means is disengaged from the record, and trigger means responsive to the movement of a record being placed on said mandrel to trip said latching means and return said one mandrel to its normal belt record tensioning position and to move said carriage slide back to its position where said head means may be engaged with said record.

11. Apparatus as claimed in claim 10, wherein the connection between said lever means and said guide rod includes a lost-motion device permitting backspacing rotation of said guide rod without corresponding movement of said belt release button.

12. Apparatus as claimed in claim 11, wherein said belt release button is mounted on a shaft which is integral with said lever means, said linkage means including an element which is secured to said shaft, and a mandrel cocking lever engageable by said element when said button is pressed and operable to shift said one mandrel towards the other mandrel.

13. Apparatus as claimed in claim 12, wherein said latching means includes a finger on said trigger means, said finger being arranged to engage said linkage means element to hold said element and said button shaft in the position where said belt record is released and said guide rod is rotated to disengage said head means from said record.

14. Apparatus as claimed in claim 10, including motor-driven gear means for providing power to rotate said guide rod during a backspacing operation, mechanically-vibratable means mounted for movement towards engagement with a moving part of said gear means, and means controlled by said lever means to shift said vibratable means into engagement with said moving part whenever said lever means is actuated by said belt release button, thereby to warn the dictator that the record is not in condition for recording operations.

References Cited

UNITED STATES PATENTS

| | | | |
|---|---|---|---|
| 744,267 | 11/1903 | Weber | 274—21 |
| 1,275,257 | 8/1918 | Holland | 274—21 |
| 2,070,180 | 2/1937 | Renholdt | 274—21 |
| 3,056,606 | 10/1962 | Schueler | 274—17 |
| 3,134,599 | 5/1964 | Roberts | 274—21 |

NORTON ANSHER, *Primary Examiner.*

C. B. PRICE, J. F. PETERS, *Assistant Examiners.*